(12) United States Patent
Åström et al.

(10) Patent No.: US 8,078,733 B2
(45) Date of Patent: Dec. 13, 2011

(54) IMS-ENABLED CONTROL CHANNEL FOR IPTV

(75) Inventors: Bo Åström, Stockholm (SE); Ignacio Más Ivars, Sollentuna (SE); Hans Carlsson, Vallentuna (SE); Yi Cheng, Spånga (SE); Karl Norrman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 494 days.

(21) Appl. No.: 11/661,550

(22) PCT Filed: Feb. 24, 2006

(86) PCT No.: PCT/EP2006/060279
§ 371 (c)(1),
(2), (4) Date: Mar. 1, 2007

(87) PCT Pub. No.: WO2007/096001
PCT Pub. Date: Aug. 30, 2007

(65) Prior Publication Data
US 2009/0235299 A1    Sep. 17, 2009

(51) Int. Cl.
G06F 15/16    (2006.01)

(52) U.S. Cl. ........ 709/227; 709/228; 709/229; 709/249; 709/223; 370/351; 370/439; 370/486; 370/395

(58) Field of Classification Search .......... 709/227–229, 709/249, 223; 370/351, 439, 486, 395
See application file for complete search history.

(56) References Cited

U.S. PATENT DOCUMENTS

| | | | | |
|---|---|---|---|---|
| 5,764,645 A | * | 6/1998 | Bernet et al. | 370/395.52 |
| 2002/0105943 A1 | * | 8/2002 | Womack et al. | 370/352 |
| 2005/0083904 A1 | * | 4/2005 | Khartabil et al. | 370/351 |
| 2005/0135374 A1 | | 6/2005 | Isomaki | |
| 2005/0201529 A1 | * | 9/2005 | Nelson et al. | 379/45 |
| 2006/0041688 A1 | * | 2/2006 | Wright et al. | 709/249 |
| 2007/0067807 A1 | * | 3/2007 | O'Neil | 725/62 |
| 2007/0100981 A1 | * | 5/2007 | Adamczyk et al. | 709/223 |
| 2007/0118618 A1 | | 5/2007 | Kisel et al. | |

(Continued)

FOREIGN PATENT DOCUMENTS

JP    2002-354451 A    12/2002

(Continued)

OTHER PUBLICATIONS

International Search Report for PCT/EP2006/060279 mailed Oct. 31, 2006.

(Continued)

*Primary Examiner* — Wing Chan
*Assistant Examiner* — Benjamin M Thieu
(74) *Attorney, Agent, or Firm* — Nixon & Vanderhye P.C.

(57) ABSTRACT

An IMS-enabled control channel for an IPTV service is provided by receiving at a Serving Call/State Control Function (S-CSCF) a Session Initiation Protocol (SIP) REGISTER message, the SIP REGISTER message identifying the originating user, receiving at the originating user a response from the S-CSCF indicating that the originating user has been authorized, and sending a SIP INVITE message from the S-CSCF to establish an open channel connection with a selected IPTV Application Server (AS). This open channel connection can then be used for the transmission of control messages, such as for starting play, starting recording, stopping play, etc., between the STB and the IPTV applications server, as well as for the delivery of personalized content, such as advertisements, voting responses, personalized voting triggers and targeted interactive events. By maintaining an open control channel with the IPTV AS, this offers a substantial reduction in the setup delay times for different applications.

19 Claims, 4 Drawing Sheets

U.S. PATENT DOCUMENTS

2007/0140299 A1\* 6/2007 Hofmann et al. ............. 370/486
2008/0307108 A1 12/2008 Yan et al.
2009/0003227 A1\* 1/2009 Malomsoky et al. ......... 370/252

FOREIGN PATENT DOCUMENTS

| JP | 2007-180960 A | 7/2007 |
| JP | 2009-516442 A | 4/2009 |
| JP | 2009-527154 A | 7/2009 |
| WO | 03/100578 A2 | 12/2003 |

OTHER PUBLICATIONS

"Digital cellular telecommunications system (Phase 2+)", ETSI Standards, European Telecommunications Standards Institute, vol. 3-CN1, No. V5150, (2005).

Japanese Office Action w/partial English translation dated Oct. 11, 2011 (4 pages total).

\* cited by examiner

IMS-ENABLED CONTROL CHANNEL FOR IPTV

This application is the US national phase of international application PCT/EP2006/060279 filed 24 Feb. 2006 which designated the U.S., the entire content of which is hereby incorporated by reference.

FIELD OF THE INVENTION

The present invention relates to the provision of an IP Multimedia Subsystem (IMS)-enabled control channel for an IPTV service, preferably but not necessarily utilising a set top box (STB).

BACKGROUND TO THE INVENTION

IP Multimedia services provide a dynamic combination of voice, video, messaging, data, etc. within the same session. By increasing the number of basic applications and the media that it is possible to combine, it is possible to increase the number of services offered to the end users, and thus to enrich the inter-personal communication experience. This will lead to a new generation of personalized, rich multimedia communication services, including so-called "combinational IP Multimedia" services that are considered in more detail below.

IP Multimedia Subsystem (IMS) is the technology defined by the Third Generation Partnership Project (3GPP) to provide IP Multimedia services over mobile communication networks (3GPP TS 22.228, TS 23.218, TS 23.228, TS 24.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling is used to describe and negotiate the media components of the session. Whilst SIP was created as a user-to-user protocol, IMS allows operators and service providers to control user access to services and to charge users accordingly.

The boundaries between the services provided by telecommunication operators, TV operators, and internet service providers are disappearing, and such companies are all offering customers all three services (so called "triple play"). For telecommunication operators wishing to offer TV services, a popular choice is to utilize so called IPTV which delivers the TV service over IP and the customer's broadband connection (e.g. ADSL, VDSL, Public Ethernet, etc.).

IPTV has a limited bandwidth at its disposal in the "first mile" of the broadband access from the xDSL modem and the broadband access (DSLAM). Linear content delivery, in which all channels in a subscription ("program package") are simultaneously delivered to the set top box (STB), is not suitable for IPTV due to the limited bandwidth. xDSL connection capacity varies depending on the DSL version used and the distance of the "first mile". ADSL can provide a capacity between 3 to 8 Mbps, whereas ADSL2 promises to deliver up to 25 Mbps downstream and VSDL data rates greater than 30 Mbps. Standard quality MPEG2 content requires 2 Mbps per channel, and HDTV will require 8-10 Mbps per channel. Luckily, the new MPEG4 standard will decrease the required bandwidth to half with the same quality as the MPEG2 coded content. Nevertheless, the available bandwidth is a scarce resource, and IPTV solutions must limit the number of channels to be delivered over the "first mile".

Existing time-shift/chase-play solutions are either based on proprietary network technology or on PVRs in the home. The solution described herein, utilizes the standardized IMS communication system and its network architecture, and a PVR residing in the Network to limit the traffic transmitted over the first mile connection to a home.

With the convergence between IPTV services and the IMS infrastructure a new plethora of possibilities opens up for the end user to utilize the TV set. Videoconferencing, interactive gaming, personalized advertisement or interactive TV programs with viewers' feedback become a reality that is easily achievable using IMS. However, many of these applications require extensive communication between the STB and the different application servers, so that, every time a new service requires to be added to the user experience (for example when the user receives a videoconferencing call while watching TV) using a conventional IPTV system, there is a setup delay associated with setting up the different control channels and receiving the required information.

SUMMARY OF THE INVENTION

According to a first aspect of the present invention there is provided a method of providing an IMS-enabled control channel for an IPTV service, the method comprising:

receiving at a Serving Call/State Control Function (S-CSCF) a Session Initiation Protocol (SIP) REGISTER message, the SIP REGISTER message identifying the originating user;

receiving at the originating user a response from the S-CSCF indicating that the originating user has been authorised;

sending a SIP INVITE message from the S-CSCF to establish an open channel connection with a selected IPTV Application Server (AS); and sending and/or receiving control or information messages by way of the open channel connection.

By maintaining an open control channel with the IPTV AS, an embodiment of the invention offers a substantial reduction in the setup delay times for different applications, as well as a unique common control data channel that can be used to contact a STB. The IPTV AS thus becomes the 'common gateway' to the STB.

The use of IMS mechanisms to setup a persistent control channel between STB and IPTV AS in this way and the use of the control channel to deliver all the required control information from the STB to the IPTV AS and from the IPTV AS to the STB provides particular advantages in use. In particular this enables a single control channel to be used for all the different control information of the different applications that could be displayed on the TV, as well as for all the IMS infrastructure to set up the control channel and control those applications. The control channel will never be used for the media flows.

One or more aspects provide an IMS-enabled control channel for an IPTV set top box (STB). The control channel can be set up using standard IMS procedures and it can be later used to send control messages, such as for starting play, starting recording, stopping play, etc. of the STB, to the IPTV applications server, as well as for the delivery of personalized content, such as advertisements, voting responses, personalized voting triggers and targeted interactive events.

One or more aspects provide a solution to personalized STB interaction with an IPTV AS enabling sending and receiving of control commands and particular items of information that are only required to be sent from, or received by, a selected one of the STBs connected to the AS.

The 'always on' control channel reduces the setup latency for such interaction with the IPTV AS, by providing an encrypted TCP-controlled data pipe that is always ready to send and receive the different required messages. The control channel also provides the IPTV AS with the means for controlling the length and connection status of the different IPTV subscriptions, as well as providing an easily accessible secure channel for software upgrades.

Aspect(s) allow a blending of IPTV services, IMS communication services and personalized information services.

According to a further aspect of the present invention there is provided computer program code for carrying out the method of the first aspect of the invention.

BRIEF DESCRIPTION OF THE DRAWINGS

In order that the invention may be more fully understood, a preferred embodiment in accordance with the invention will now be described, by way of example, with reference to the accompanying drawings, in which.

DETAILED DESCRIPTION OF THE DRAWINGS

Figure 1:
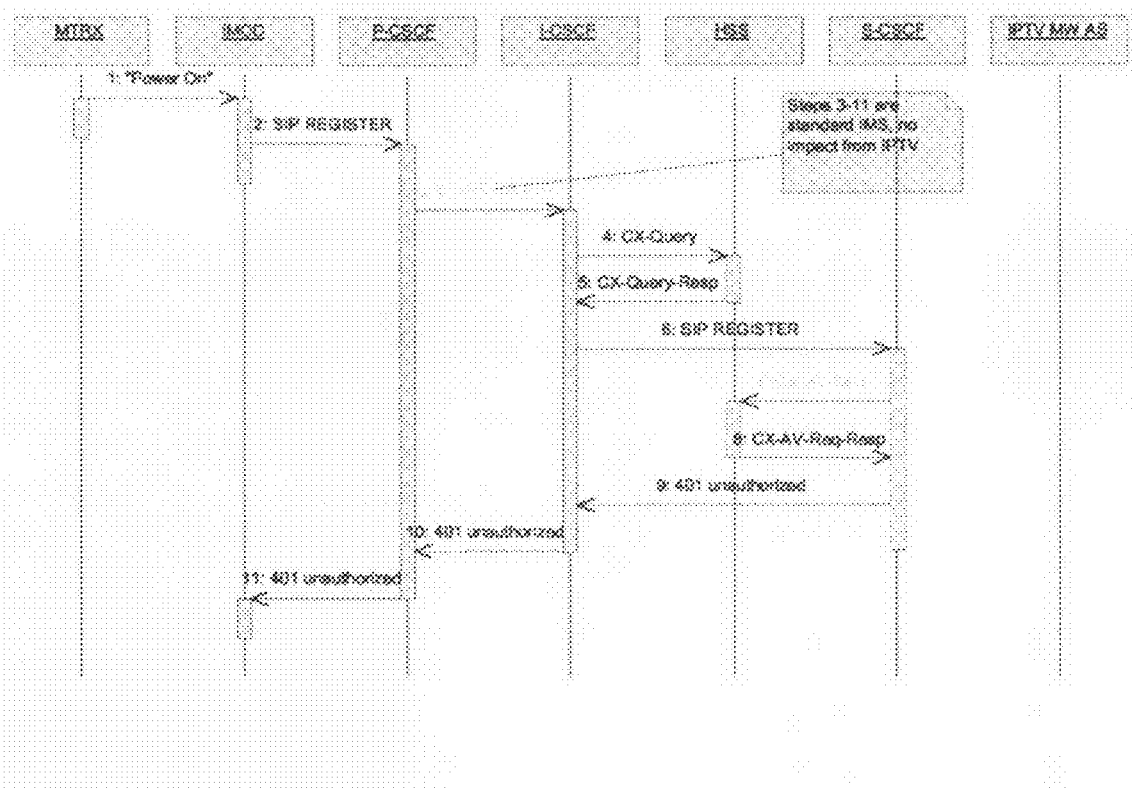
FIG. 1 is a schematic diagram illustrating a sequence in the registration of the STB.

By way of background to the preferred embodiment the following is a brief description of how the IP Multimedia Subsystem (IMS) fits into the mobile network architecture in the case of a GPRS/PS access network. Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. The user receives a unique Uniform Resource Identifier (URI) from the S-CSCF to be used when it initiates a dialog. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is important for controlling (and charging for) user access to IMS-based services. Operators may provide a mechanism for preventing direct user-to-user SIP sessions that would otherwise bypass the S-CSCF.

During the registration process, it is the responsibility of the I-CSCF to select an S-CSCF if one is not already selected. The I-CSCF receives the required S-CSCF capabilities from the home network's Home Subscriber Server (HSS), and selects an appropriate S-CSCF based on the received capabilities. (It is noted that S-CSCF allocation is also carried out for a user by the I-CSCF in the case where the user is called by another party, and the user is not currently allocated an S-CSCF.) When a registered user subsequently sends a session request (e.g. SIP INVITE) to the IMS, the request will include the P-CSCF and S-CSCF URIs so that the P-CSCF is able to forward the request to the selected S-CSCF. This applies both on the originating and terminating sides (of the IMS). (For the terminating call the request will include the P-CSCF address and the User Equipment (UE) address.)

Within the IMS service network, Application Servers (ASs) are provided for implementing IMS service functionality. ASs provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which ASs should be "linked in" during a SIP Session establishment. Different IFCs may be applied to different call cases. The IFCs are received by the S-CSCF from an HSS during the IMS registration procedure as part of a user's User Profile (UP). Certain ASs will perform actions dependent upon subscriber identities (either the called or calling subscriber, whichever is "owned" by the network controlling the AS). For example, in the case of call forwarding, the appropriate (terminating) application server will determine the new terminating party to which a call to a given subscriber will be forwarded.

The preferred embodiment to be described below relates to an IMS-enabled control channel for an IPTV set top box (STB). The control channel is set up using standard IMS procedures and is later used to send control messages to the IPTV applications server, as well as to deliver personalized content, such as advertisements, voting responses, personalized voting triggers and targeted interactive events. In this regard it is important to appreciate that the setting up of the control channel can be done directly from the user's own STB or it can be done remotely, using the other ID, from another STB.

There is a single IPTV subscription having an IMS Private Identity that may be the same as the "Home line IMS subscription" as used in the "Rechon Architecture", EAB-05: 045608, Rev A, 2005 Dec. 22. The IPTV subscription contains several IMS Public IDs (IMPUs), that is one IMPU for each STB. More precisely, the IMPU is allocated to the MTRX, so that, for example, the IMPU is used as a default for the MTRX if no individual user (family member) has logged on to it (e.g. sip:tv1_subscr17525@imsop.com). There are zero, one or several additional Public Identities associated with the IPTV subscription, each representing a user. These are used when the user logs on to the STB for personalized services (e.g. sip:sickan@imsop.com). Additional public identities for users with separate Private Identities (PIs), that is IMPUs that are not from the IPTV ISIM, e.g. sip: sickan_mob@imsop2.com, are also possible. These are used when the user logs on with this external identity to the IPTV service.

When the STB starts, it first registers on the IMS network using the IMS Private ID (IMPI—the private address of the STB) of the Identity and IMS Module (IMOD) in the authorization header, and the default 'family STB' public address in the "From" and "To" headers (as in the normal SIP REGISTER message). Both IMPUs representing the Media Transmitter/Receivers (MTRXs) and IMPUs representing users may register. For personalisation of services, the "User Connection to IPTV MW AS" use routine set out in FIG. 1 is executed. At most one user can be connected to the AS for one MTRX at a time. (When a new user connects, the AS either refuses the new connection or replaces the old user with the new one.) All these sub-use routines will work in the same way regardless of whether the access is from a mobile phone or from a wireline STB.

Referring to FIG. 1, the "User Connection to IPTV MW AS" use routine comprises the following process steps (referring to the numbers in the figure):

1. The MTRX is powered on and sends an indication to this effect to the IMOD that includes its IP address.
2. The IMOD sends a SIP REGISTER message to the P-CSCF. The IMPU of the MTRX is used in the "To" header. The home SIP URI of the home network domain name is included in the Request-URI. The IMPI of the IMOD is included in the "Authorization" header. The contact header includes the IP address of the IMOD. If the access network provider and the IMS operator are the same, then the P-CSCF discovery is handled by a DHCP procedure (as per existing IMS standards). If this is not the case, the P-CSCF discovery could be handled by the IMS SIM (ISIM) configuration. The ISIM contains an EF where the P-CSCF address is stored, so that this is configured by the operator before the ISIM is distributed to the user.
3. The P-CSCF uses the "home domain name" in the SIP REGISTER message to discover the entry point to the home network (i.e. the I-CSCF). The P-CSCF sends the SIP REGISTER message (P-CSCF address/name, Public User Identity, Private User Identity, P-CSCF network identifier, IMOD IP address) to the I-CSCF. A name-address resolution mechanism is utilized in order to determine the address of the home network from the home domain name. The P-CSCF network identifier is a string that identifies, at the home network, the network where the P-CSCF is located. For example, the P-CSCF network identifier may be the domain name of the P-CSCF network, as per existing IMS standards.
4. The I-CSCF sends the Cx-Query/Cx-Select-Pull data (Public User Identity, Private User Identity, P-CSCF network identifier) to the HSS, as per existing IMS standards. The HSS checks whether the user is registered already. The HSS indicates whether the user is allowed to register in that P-CSCF network (identified by the P-CSCF network identifier) according to the user subscription and operator limitations/restrictions (Cx-Query Resp/Cx-Select-Pull Resp/Cx-AV-Resp), if any, as per existing IMS standards.
5. The Cx-Query Resp/Cx-Select-Pull Resp data is sent from the HSS to the I-CSCF and contains the S-CSCF name, if it is known by the HSS, and the S-CSCF capabilities, if it is necessary to select a new S-CSCF. When the response contains both the S-CSCF name and the S-CSCF capabilities, the I-CSCF can perform a new assignment. When only the S-CSCF capabilities are returned, the I-CSCF performs the new S-CSCF selection function based on the S-CSCF capabilities returned. If checking in the HSS provides a negative result, the Cx-Query Resp rejects the registration attempt, as per existing IMS standards.
6. The I-CSCF, using the name of the S-CSCF, determines the address of the S-CSCF through a name-address resolution mechanism. The I-CSCF then sends SIP REGISTER message (P-CSCF address/name, Public User Identity, Private User Identity, P-CSCF network identifier, IMOD IP address) to the selected S-CSCF. The home network contact point is used by the P-CSCF to forward a session initiation message to the home network. The S-CSCF stores the P-CSCF address/name, as supplied by the visited network, representing the address/name that the home network forwards in the subsequent terminating session signal to the IMOD. The S-CSCF stores the P-CSCF network ID information, as per existing IMS standards.
7. The S-CSCF sends the Cx-AV-Req request to the HSS to request the authentication vector, as per existing IMS standards.
8. The authentication vector is received in the Cx-AV-Resp, as per existing IMS standards.
9. The S-CSCF returns a 401 Unauthorized response with the authentication vector, as per existing IMS standards.
10. The I-CSCF forwards the authentication vector to the P-CSCF in a 401 Unauthorized response, as per existing IMS standards.
11. The P-CSCF sends a 401 Unauthorized response with a challenge (RAND part of the authentication vector) and a network authentication token (AUTN) to the IMOD. The IMOD verifies that the AUTN is correct and calculates a response to send to the network. In this step the IMOD can calculate the key material, based on the CK and IK key pair and a known algorithm (the algorithm is public and known to both the IMOD and the IPTV MW AS).

Figure 2:
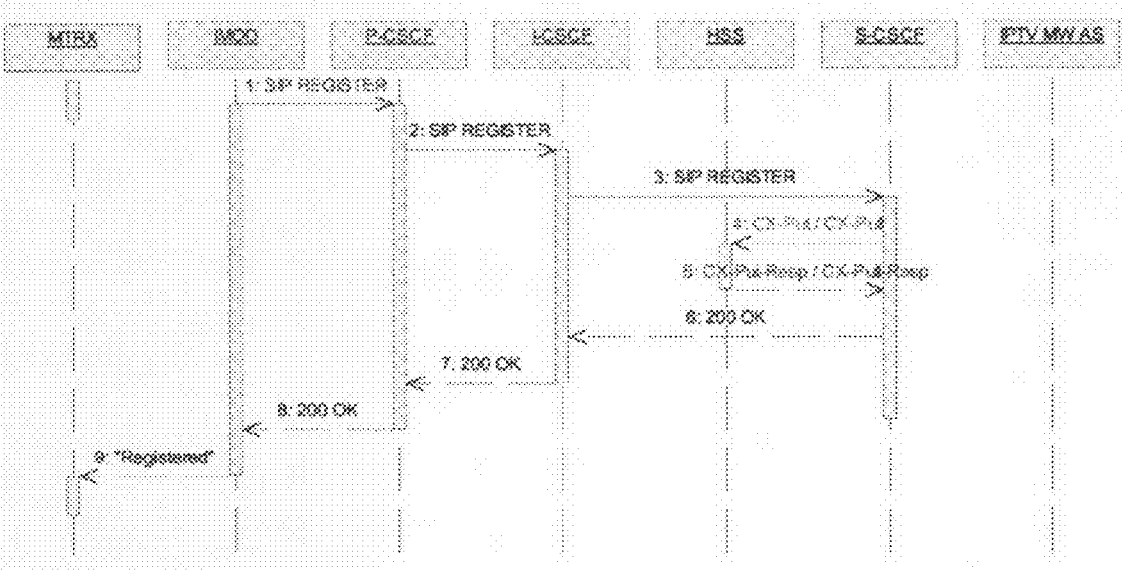
FIG. 2 is a schematic diagram illustrating a further sequence in the registration of the STB.

FIG. 2 schematically illustrates the following further steps of this routine (referring to the numbers in the figure):

1. The sending of a SIP REGISTER message from the IMOD to the P-CSCF in response to the challenge, this time with the challenge response included, as per existing IMS standards.
2. The sending of the SIP REGISTER message including the challenge response from the P-CSCF to the I-CSCF, as per existing IMS standards.
3. The sending of the SIP REGISTER message including the challenge response from the I-CSCF to the S-CSCF, as per existing IMS standards.
4. The verification by the S-CSCF verifies that the challenge response is correct, and the transmission of the Cx-Put/Cx-Pull (Public User Identity, Private User Identity, S-CSCF name) data to the HSS, as per existing IMS standards.
5. The storage in the HSS of the S-CSCF name for that user and the return of the Cx-Put Resp/Cx-Pull Resp (user information) data to the S-CSCF. The user information (Initial Filter Criteria) passed from the HSS to the S-CSCF includes name and address information that can be used to access the platform(s) used for service control while the user is registered at this S-CSCF. The S-CSCF stores the information for the indicated user.
6. The return by the S-CSCF of a 200 OK response.
7. The forwarding by the I-CSCF of the 200 OK response.
8. The forwarding by the P-CSCF of the 200 OK response.
9. The transmission of the "Registered" message from the IMOD to the MTRX.

Figure 3:
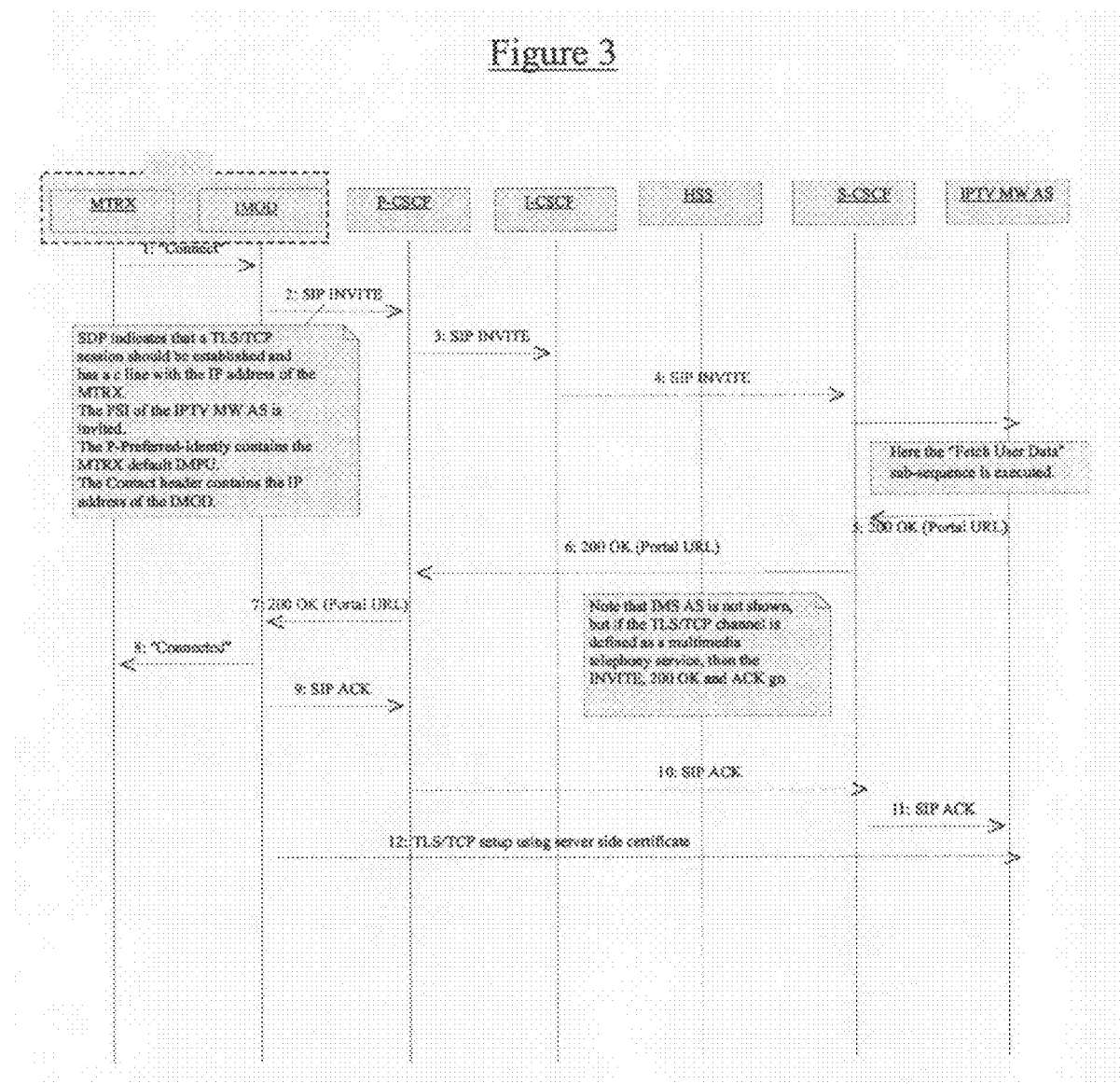
FIG. 3 is a schematic diagram illustrating the establishment of a secure TCP/TLS connection.

Once the STB is registered, it establishes a secure TCP/TLS connection with the IPTV AS, using a SIP INVITE. The procedure is as follows as schematically indicated in FIG. 3 (referring to the numbers in the figure):

1. The MTRX (the media end point of the STB) indicates to the IMOD (the Authentication/ISIM carrier part of the STB) that a connection to the IPTV MW AS should be established. The differentiation between the IMOD and the MTRX is optional, and can be seen as an STB internal realization. An STB not having this differentiation would behave identically in relation to the IMS network.
2. The IMOD sends a SIP INVITE to the P-CSCF. The Public Service Identity of the IPTV MW AS is used to address the IPTV MW AS and may be pre-configured in the ISIM or configured by device management procedures. An SDP description of a TLS/TCP session is included. An alternative procedure would be to use an application framing protocol over the pure TCP/TLS channel, such as MSRP. In this case the SDP description contains MSRP/TLS/TCP instead of only TLS/TCP.

3. The SIP INVITE is forwarded to the I-CSCF. 3GPP 23.228 describes alternative PSI routing on the terminating side, namely:

a. The I-CSCF interrogates I HSS where the HSS treats every PSI as a "user" and returns routing instructions to the end-point representing the PSI.

b. I-CSCF interrogation to the HSS where the HSS returns the user allocated S-CSCF. The S-CSCF routes the PSI addressed Invite according to IFC information stored per "PSI-subscriber". The "PSI-subscriber" is assigned an S-CSCF.

c. Sub-domain routing in the I-CSCF where the I-CSCF uses DNS to resolve the PSI into an IP-address for the end-point representing the PSI.

This solution requires Alternative b.

4. The I-CSCF uses DNS to translate the Public Service Identity to the IP address of the actual server that will handle this user this time (load sharing can be applied here). The S-CSCF then sends the SIP INVITE to the chosen IPTV MW AS. The IPTV MW AS then executes the "Fetch User Data" subsequence.

5. The IPTV MW AS returns a 200 OK response. The URL of the user's TV service portal is included in the SDP, as, for example, an XML body that is interpreted in the STB but not in the intermediate nodes.

6. The S-CSCF forwards the 200 OK response.

7. The P-CSCF forwards the 200 OK response.

8. The IMOD receives the URL of the default user's TV service portal (i.e. the portal associated with the IMPU of the MTRX), and it is included in the SDP. This information may be included as an XML body in the 200 OK message, but other means are also possible.

9. The IMOD sends a SIP ACK response.

10. The P-CSCF forwards the SIP ACK response.

11. The S-CSCF forwards the SIP ACK response.

12. The IMOD sets up a TLS/TCP connection to the IPTV MW AS using a server side certificate.

The TLS/TCP connection can then be used as a dedicated "always on" control channel for all required control and information messages to be transmitted between the STB and the IPTV AS. The information messages may incorporate personalized content that is stored in a common database somewhere in the network infrastructure. This content will be filtered through the profile records of the user that are stored in the HSS or some other 'user profile database', and then delivered to the IPTV AS (or alternatively the IPTV AS may itself direct the content according to the filters). The content is supplied from the IPTV AS to the STB by way of the control channel. The different CSCF's cannot see the content of the encrypted channel and in fact the content does not traverse any other of the IMS nodes. The control channel is an end-to-end connection between the STB and the IPTV AS.

This procedure can also be expanded to add distribution of keys for service protection (a.k.a. conditional access) if the service protection in the system is based on ciphering the content streams. This would involve additional steps after the last step above in which, for example, the keys could be fetched via HTTP. If the different users have different channel bundles, then that type of step would also be needed after the "User Connection, Local User" procedure.

This procedure could also be run only on an "as needed" basis (i.e. the connection would not be automatically set up at registration, but only when access to the IPTV MW AS is required), but the preferred alternative is that the connection is established immediately after the STB/MS registers. This is so that the delay in setting up this connection can be avoided at a time when interaction with the IPTV MW AS is required.

A new control channel is established for each MTRX that is to be connected to the IMOD, as described in the "IMS IPTV Architecture Study" ("Rechon Architecture", EAB-05: 045608, Rev A, 2005 Dec. 22).

The described control channel enables a plethora of functionalities, like remote control on the IPTB STB, as described in "IMS IPTV Architecture Study", EAB-06:001721, Rev A, 2006 Feb. 8, or the user cases described in next section.

The "Fetch User Data" subsequence referred to above is used by the IPTV MS AS to obtain the key material based on the CK and IK key pair (resulting from the IMS AKA authentication during the registration procedure) from the S-CSCF. The key material may be derived from CK and IK or by some other means. The actual derivation may take place in a node different from the S-CSCF, which would require some additional signalling between the S-CSCF and the key deriving node (not shown in the figure). This is not per existing IMS standards, so that this would have a product and standards impact. Another possibility would be that the S-CSCF delivers the authentication vector to the AS when forwarding the INVITE.

Figure 4:
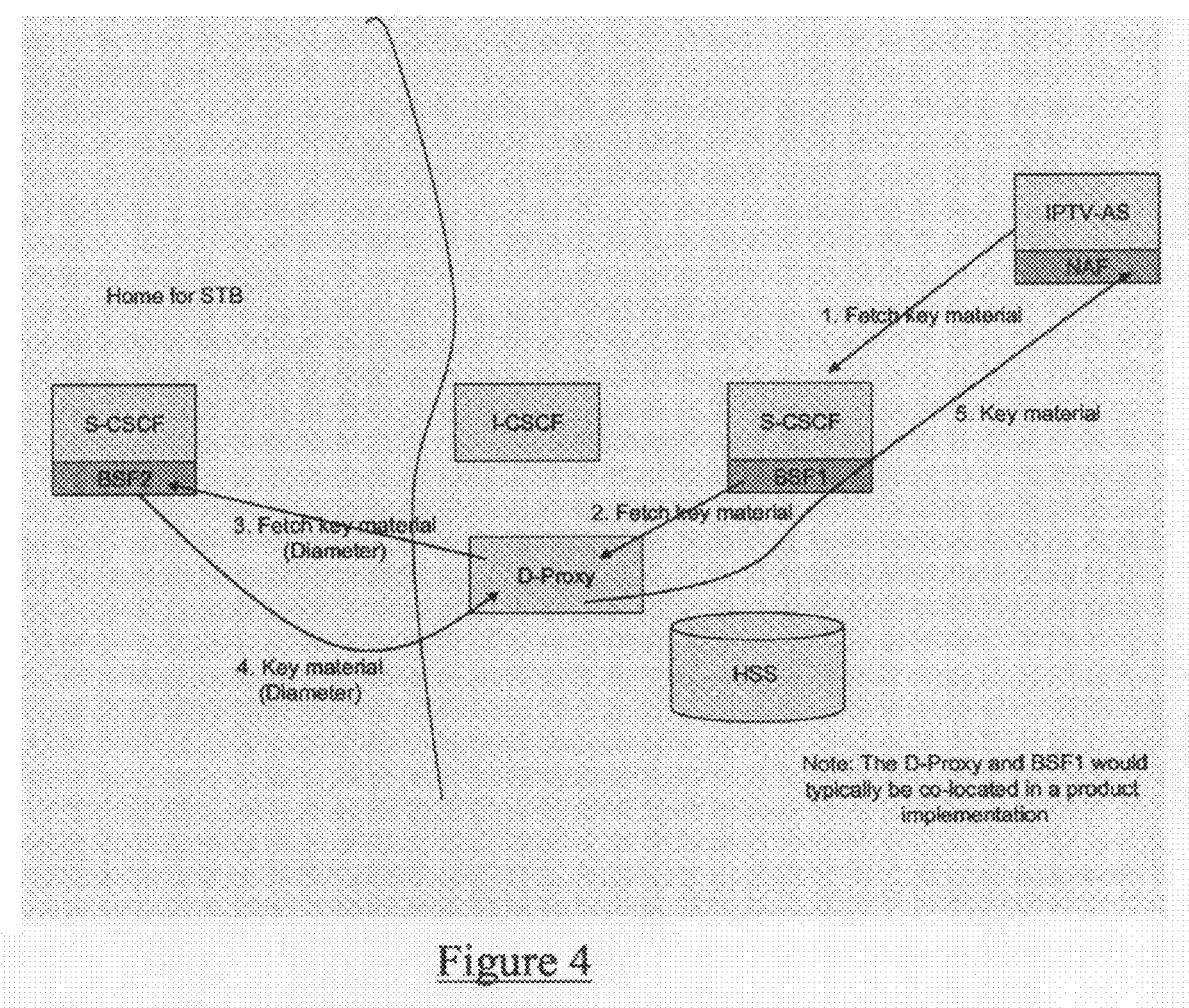
FIG. 4 is a schematic diagram illustrating a "Fetch User Data" subsequence.

The procedure is as follows, as shown schematically in FIG. 4 (referring to the numbers in the figure):

1. The Network Application Function (NAF) in the IPTV AS issues a 'Fetch key material' request to the S-CSCF.

2. The S-CSCF Bootstrapping Server Function (BSF) contacts the Diameter proxy (D-Proxy) to obtain the key material.

3. The D-Proxy contacts the BSF of the S-CSCF in the home domain for the STB.

4. The BSF in the home domain of the STB delivers the key material to the D-Proxy in the domain of the IPTV AS.

5. The D-Proxy delivers the key material to the S-CSCF, which in turn delivers it to the IPTV-AS.

6. Based on the key material and a known protocol/algorithm (the protocol/algorithm is public and known to both the IMOD and the IPTV MW AS, e.g. Digest Authentication) the IMOD is authenticated. It should be noted that the IMOD can derive the same key material that the IPTV MW AS received in the INVITE sequence earlier.

Another possible implementation is to have the BSF separated from the S-CSCF which would require explicit GAA/GBA signalling from the STB and the IPTV AS to the respective BSF's.

Figure 5:
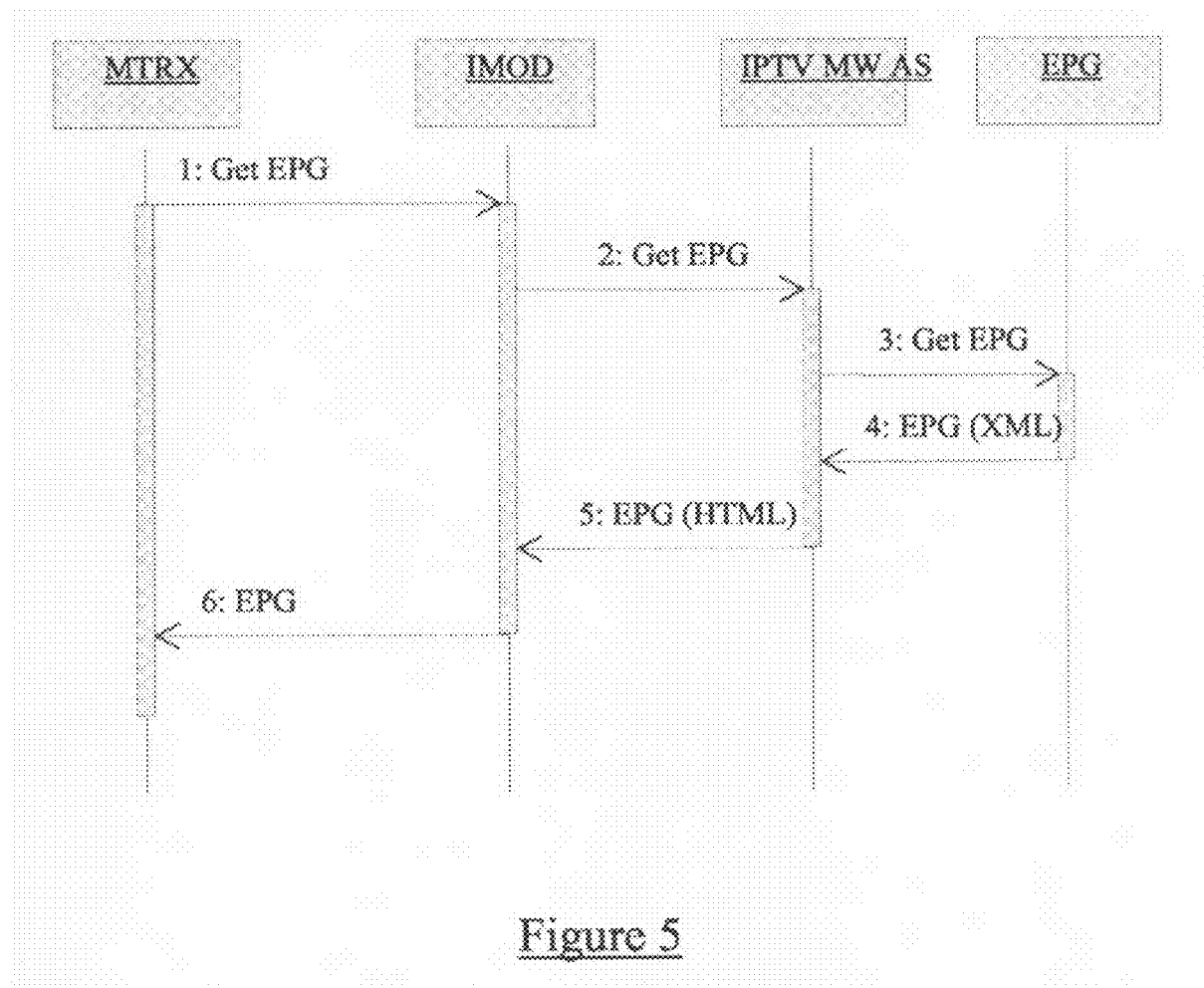
FIG. 5 is a schematic diagram illustrating the establishment of an electronic program guide (EPG).

Once the control channel is established an electronic program guide (EPG) can be fetched from the IPTV AS using the secure connection. The EPG can be customized for the particular subscription of the user currently logged in or it can be the default EPG for the type of subscription that this STB contains. The sequence as shown diagrammatically in FIG. 5 is as follows (referring to the numbers in the figure):

1. The MTRX requests the EPG for the user from the IMOD.

2. The IMOD user requests the EPG list as an html page, this being done using the previously set up secure connection to the IPTV MW AS.

3. The IPTV MW AS requests the EPG data from the EPG server.

4. The EPG server sends the EPG XML data to the IPTV MW AS.

5. The IPTV MW AS generates the html page with the information valid for the currently logged on user and sends it to the IMOD.

6. The IMOD returns the EPG for the user to the MTRX.

When a user wants to "log on" to the TV service to get access to his/her personal EPG, etc., a personalization button is pressed on the remote control, which triggers a new registration in the IMOD using the IMPU of the new user. If another user was already registered for this MTRX, the IMOD closes the TLS/TCP session for that user and de-registers the user.

Then the IMOD invites the IPTV MW AS using the PSI. The P-Preferred-Identity is set to the IMPU of the "blue" user. An SDP description of a TLS/TCP session is included. The rest of the procedure follows the general case.

At predefined intervals, a set of advertisements based on personalized filters for the current user are supplied over the control channel to the MTRX. These advertisements can be defined so that they are displayed in certain areas of the screen while the user is watching the TV, or they can await receipt of a particular trigger to cause them to be displayed full screen on the TV. The filters to personalized advertisements are based on the profile information stored in the different IMS databases (HSS and others) as well as on the information of what the particular user is watching.

The STB control channel allows the IPTV AS to know the 'health' status of the different STB connected to it. By defining a suitable keep-alive mechanism, which will consume very little resource since the channel is always on, it is possible to supply software upgrades to the STB and to perform certain server-initiated functions such as subscription upgrades or even ISIM interaction from the operator.

Aspects of the invention provides a solution for personalized STB interaction with an IPTV AS that can be used to send and receive control commands and to deliver any particular item of information which should only be sent from or received by a selected one of all the STBs connected to the AS.

The 'always on' control channel reduces the setup latency for all interactions with the IPTV AS, by providing an encrypted TCP-controlled data pipe that is always ready to send and receive the different required messages. This control channel also provides the IPTV AS with the means for controlling the length and connection status of the different IPTV subscriptions, as well as providing an easily reachable secure channel for software upgrades.

Aspects of the invention offer a blending of IPTV services, IMS communication services and personalized information services.

It will be appreciated by the persons skilled in the art that various modifications may be made to the embodiments described above without departing from the scope of the present invention.

The invention claimed is:

1. A method of providing an IMS-enabled control channel for an IPTV service, the method comprising:
   receiving at a Serving Call/State Control Function (S-CSCF) a Session Initiation Protocol (SIP) REGISTER message, the SIP REGISTER message identifying an originating user;
   receiving at a SIP terminal of the originating user a response from the S-CSCF indicating that the originating user has been authorized;
   sending a SIP INVITE message from the S-CSCF to establish an open persistent control channel between the SIP terminal of the originating user and a selected IPTV Application Server (AS); and
   sending and/or receiving control or information messages by the SIP terminal of the originating user by way of the open persistent control channel,
   wherein the SIP REGISTER message is sent in response to receipt of a power-on message from a media transmitter/receiver (MTRX) including an IP address of the MTRX.

2. The method according to claim 1, wherein the open persistent control channel is set up using standard IMS procedures.

3. The method according to claim 1, wherein the control or information messages include IMS messages to the IPTV AS.

4. The method according to claim 1, wherein the control or information messages include personalized content, relating to any one or more of an advertisement, a voting response, a personalized voting trigger and a targeted interactive event.

5. The method according to claim 1, wherein the SIP REGISTER message is received from an identity and IMS module (IMOD) and includes an IP address of the IMOD.

6. The method according to claim 1, wherein the SIP REGISTER message is received by a Proxy Call/State Control Function (P-CSCF) that forwards the SIP REGISTER message to an Interrogating Call/State Control Function (I-CSCF) for directing the SIP REGISTER message towards a selected S-CSCF.

7. The method according to claim 1, wherein the S-CSCF returns an authentication message in response to receipt of the SIP REGISTER message.

8. The method according to claim 1, wherein the S-CSCF receives a SIP REGISTER message including a challenge response in response to sending of an authentication message.

9. The method according to claim 8, wherein the S-CSCF performs a verification check on the challenge response and sends a connection enabling message in the event of positive verification.

10. The method according to claim 1, wherein a secure connection established is a TLS/TCP connection or a MSRP/TLS/TCP connection.

11. The method according to claim 1, wherein a fetch user data subsequence is initiated by the IPTV AS on receipt of the SIP invite message.

12. The method according to claim 1, wherein the open persistent control channel is an always on control channel for transmitting control and information messages between the SIP terminal of the originating user and the selected IPTV AS.

13. The method according to claim 1, wherein the open persistent control channel is an always on control channel remains open for a duration of a session between the SIP terminal of the originating user and the selected IPTV AS.

14. An IMS-enabled control system for an IPTV service, comprising:
   means for receiving at a Serving Call/State Control Function (S-CSCF) a Session Initiation Protocol (SIP) REGISTER message, the SIP REGISTER message identifying the originating user;
   means for receiving at the originating user a response from the S-CSCF indicating that the originating user has been authorized;
   means for sending a SIP INVITE message from the S-CSCF to establish a open persistent control channel between the originating user and a selected IPTV Application Server (AS); and
   means for sending and/or receiving control or information messages by way of the open persistent control channel,
   wherein the SIP REGISTER message is sent in response to receipt of a power-on message from a media transmitter/receiver (MTRX) including an IP address of the MTRX.

15. The system according to claim 14, wherein the open persistent control channel is an always on control channel for transmitting control and information messages between the SIP terminal of the originating user and the selected IPTV AS.

16. The system according to claim 14, wherein the open persistent control channel is an always on control channel remains open for a duration of a session between the SIP terminal of the originating user and the selected IPTV AS.

17. A non-transitory computer readable medium comprising non-transitory code adapted to be executed in an IMS-enabled control system, the computer code adapted to implement a method for providing an IMS-enabled control channel for an IPTV service, the method comprising:
receiving at a Serving Call/State Control Function (S-CSCF) a Session Initiation Protocol (SIP) REGISTER message, the SIP REGISTER message identifying an originating user;
receiving at a SIP terminal of the originating user a response from the S-CSCF indicating that the originating user has been authorized;
sending a SIP INVITE message from the S-CSCF,
wherein the computer code is adapted to establish an open persistent control channel between the SIP terminal of the originating user and a selected IPTV Application Server (AS) and adapted to send and/or receive control or information messages by way of the open persistent control channel, and
wherein the SIP REGISTER message is sent in response to receipt of a power-on message from a media transmitter/receiver (MTRX) including an IP address of the MTRX.

18. The non-transitory computer readable medium according to claim 17, wherein the open persistent control channel is an always on control channel for transmitting control and information messages between the SIP terminal of the originating user and the selected IPTV AS.

19. The non-transitory computer readable medium according to claim 17, wherein the open persistent control channel is an always on control channel remains open for a duration of a session between the SIP terminal of the originating user and the selected IPTV AS.

* * * * *

UNITED STATES PATENT AND TRADEMARK OFFICE
CERTIFICATE OF CORRECTION

| | | |
|---|---|---|
| PATENT NO. | : 8,078,733 B2 | Page 1 of 1 |
| APPLICATION NO. | : 11/661550 | |
| DATED | : December 13, 2011 | |
| INVENTOR(S) | : Aström et al. | |

It is certified that error appears in the above-identified patent and that said Letters Patent is hereby corrected as shown below:

In Column 1, line 16, in Heading, delete "TO" and insert -- OF --, therefor.

Signed and Sealed this
Eighteenth Day of September, 2012

David J. Kappos
*Director of the United States Patent and Trademark Office*